Jan. 24, 1950   M. I. DORFAN   2,495,512
BUBBLE TOWER

Filed Aug. 2, 1945   3 Sheets-Sheet 1

WITNESSES:
E. J. Maloney
V. A. Peckham

INVENTOR.
MORTON I. DORFAN.
BY Brown, Critchlow & Flick
his ATTORNEYS.

Jan. 24, 1950 M. I. DORFAN 2,495,512
BUBBLE TOWER

Filed Aug. 2, 1945 3 Sheets-Sheet 2

WITNESSES.
E. J. Maloney.
V. A. Peckham

INVENTOR.
MORTON I. DORFAN.
BY Brown, Critchlow & Flick
his ATTORNEYS.

Patented Jan. 24, 1950

2,495,512

UNITED STATES PATENT OFFICE 2,495,512

BUBBLE TOWER

Morton I. Dorfan, Pittsburgh, Pa.

Application August 2, 1945, Serial No. 608,501

2 Claims. (Cl. 261—114)

This invention relates to bubble towers, and more particularly to the trays used therein in which a gas passes through a liquid.

It is among the objects of this invention to provide a bubble tower tray of simplified construction in which the pressure drop of the gas flowing therethrough is minimized, and from which the sediment deposited by the gas can be drained.

Figure 1:
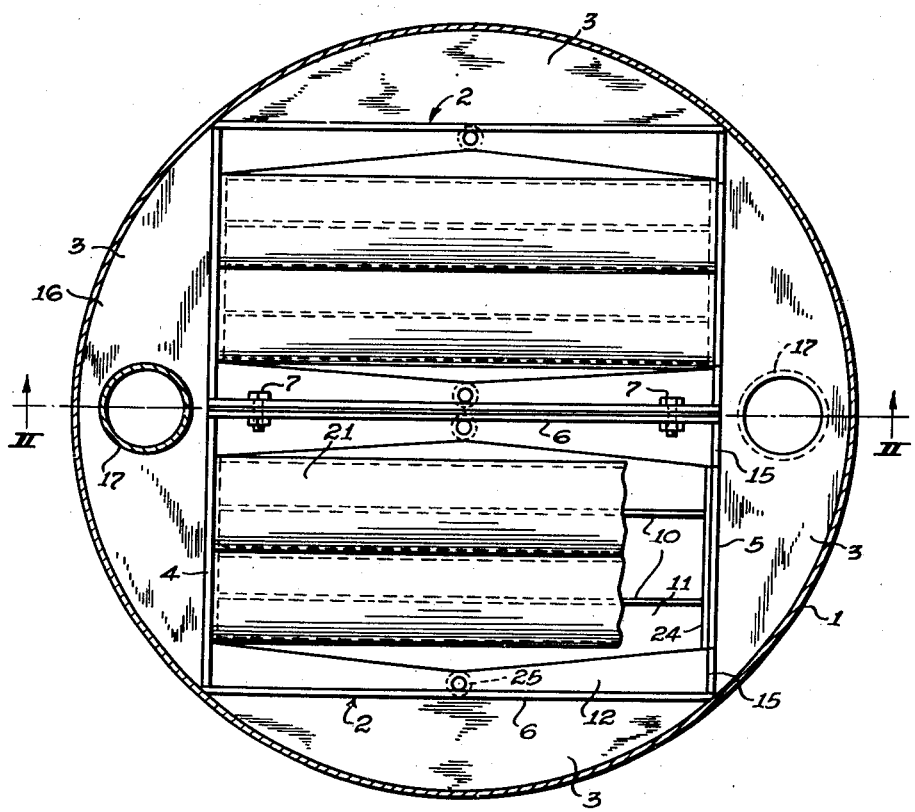
Figure 2:
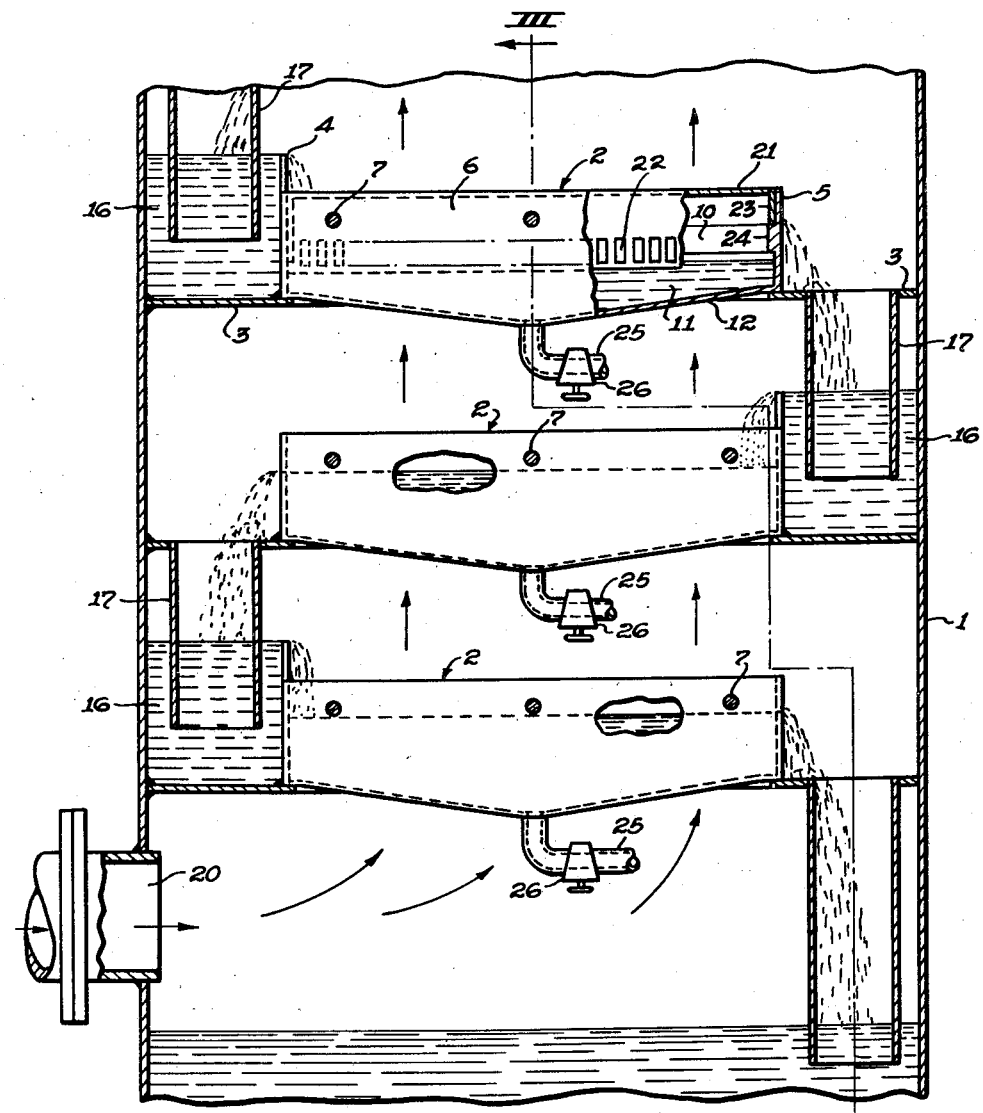
Figure 3:
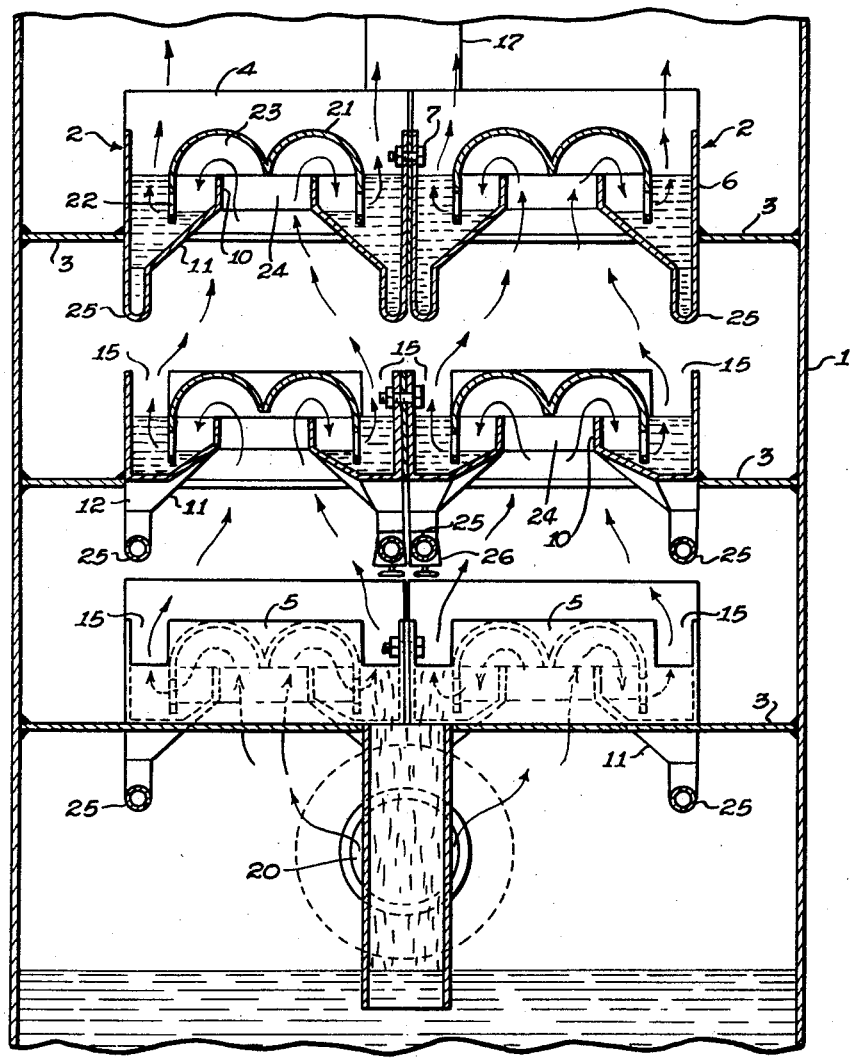

The preferred embodiment of this invention is illustrated in the accompanying drawings in which Fig. 1 is a horizontal section through a bubble tower showing trays in plan; Fig. 2 is a vertical section, partly broken away, taken on the line II—II of Fig. 1; and Fig. 3 is a vertical section taken on the line III—III of Fig. 2.

Referring to the drawings, a tank-like tower 1 of any desired height contains several tiers of trays 2. Although the tower may be cylindrical as shown, it also could be any other desired shape. There may be one or more trays in each tier, two being shown in the drawings for the purpose of illustration. The trays are supported by horizontal plates 3 welded or otherwise secured to the side of the tank with the trays resting on their inner edges. These plates therefore close the spaces between the straight sides and ends of the rectangular trays and the curved wall of the tank. Each tray has vertical end walls 4 and 5 and side walls 6, the adjoining side walls of the trays in each tier being connected by bolts 7. Furthermore, each tray is divided longitudinally into two laterally spaced troughs the outer side walls of which are formed by the side walls of the tray. As shown in Fig. 3, the inner walls of the troughs are spaced apart and have substantially parallel upper portions 10 connected by substantially straight downwardly diverging lower portions 11 to the bottom walls 12 of the troughs. The space between the troughs therefore forms a vertical passage that tapers upwardly in transverse section.

Water, flowing into the troughs over the high end wall 4 of each tray, flows lengthwise of the troughs and out through outlets in the other end wall 5 of the tray formed by cutting recesses 15 therein. The water level in the troughs is maintained by the outlets at about the height of their inner walls which are lower than the side and end walls. Water is supplied to the trays continuously from tanks 16 formed between the high end walls of the trays and the adjoining side of the tower. Water flows into these tanks through vertical pipes 17 projecting into them from the tray-supporting plates 3 above onto which the water is emptied by the adjacent trays. The trays are reversed in alternate tiers so that the inlet ends of the trays in one tier are below the outlet ends of the trays above, as shown in Fig. 2.

The lower part of the tower is provided with a lateral inlet 20 through which is introduced the gas that is to be scrubbed in the tower. This gas flows upwardly through the vertical passages between the troughs in the trays, but in order to pass from a tray to the tray above, the gas must first flow through the water in the first tray. The gas is directed through the water in the troughs by a cap 21 mounted on each tray above its central passage. The cap has side walls extending down into the water in the adjacent troughs. These side walls are spaced from the sides of the troughs and are provided with rows of laterally spaced vertical slots 22 extending through them so that gas entering the troughs on the inside of such walls can pass outwardly through them after it has forced the water level down low enough to expose the slots. The caps are supported in the trays by their end walls 23 which rest on horizontal shoulders formed by providing the end walls of the trays with thickened portions 24 projecting inwardly. The ends of the side walls of the caps overlap the ends of these thickened portions and thus center the caps transversely of the trays. The top of each cap between its vertical side walls is divided into two longitudinally extending areas that are arched transversely. The inner edges of these arched areas meet above the center of the space between the troughs and thus divide the rising stream of gas into two streams that are directed laterally in opposite directions into the two troughs.

In order to keep the sediment, which continuously is being washed out of the gas, from becoming so deep in the troughs as to restrict or plug slots 22, the bottom of the trough is inclined longitudinally and is provided at its lowest point with a drain opening to which a pipe 25 is connected. Preferably, as shown in Fig. 2, the trough bottom is inclined from both ends downwardly towards its center where the drain is located. Pipe 25 may be provided with a valve 26 for periodic draining of the associated trough, or it may be left open so that the sediment settling in the trough will be carried away continuously. Pipes 25 lead to any suitable point of discharge. For example, they may extend out through the side wall of the tank, or they may empty into a suitable receptacle inside the tank.

According to the provisions of the patent statutes, I have explained the principle and construction of my invention and have illustrated and described what I now consider to represent its best embodiment. However, I desire to have it understood that, within the scope of the appended claims, the invention may be practiced otherwise than as specifically illustrated and described.

I claim:

1. In a bubble tower, a plurality of trays each having a pair of laterally spaced troughs through which a liquid flows, the space between the troughs forming a passage for gas, the side walls of the troughs forming said passage having substantially parallel upper portions and substantially straight downwardly diverging lower portions, the inner surfaces of the end walls of the tray being provided with horizontal shoulders, a removable cap having end walls resting on said shoulders and having side walls extending down into the liquid in the troughs, said side walls being provided with rows of vertical slots therethrough, the top wall of the cap having a pair of transversely arched areas extending lengthwise thereof and meeting along their inner edges above the center of said passage, whereby said gas is directed by said cap down into said troughs and through said slots and liquid, each trough having a longitudinally inclined bottom provided at its lowest point with a drain opening, and a pipe connected to said opening for draining sediment from the trough.

2. In combination, a bubble tower rectangular tray having between its side walls a pair of laterally spaced inner walls, said inner walls having substantially parallel upper portions and substantially straight downwardly diverging lower portions forming an upwardly converging gas passage between the inner walls, longitudinally inclined bottom walls connecting said inner walls with said side walls to form a pair of spaced troughs through which a liquid can flow, the inner surfaces of said end walls being provided with horizontal shoulders, a removable cap having end walls resting on said shoulders and having side walls extending down into the liquid in the troughs, the top wall of the cap having a pair of transversely arched areas extending lengthwise thereof and meeting along their inner edges above the center of said passage, whereby said gas is directed by said cap down into said troughs and through liquid therein, each of said bottom walls being provided with a drain opening at its lowest point, and a pipe connected to said opening for draining sediment from the trough.

MORTON I. DORFAN.

REFERENCES CITED

The following references are of record in the file of this patent:

UNITED STATES PATENTS

| Number | Name | Date |
|---|---|---|
| 1,782,862 | Wagner | Nov. 25, 1930 |
| 1,848,462 | Corbett | Mar. 8, 1932 |
| 1,893,906 | Primrose | Jan. 10, 1933 |
| 1,918,005 | Urquhart | July 11, 1933 |
| 2,194,126 | Schwandt | Mar. 19, 1940 |
| 2,365,483 | Mode | Dec. 19, 1944 |
| 2,378,952 | Rousseau | June 26, 1945 |